United States Patent [19]

Tsukagoshi

[11] 3,961,797

[45] June 8, 1976

[54] PHONOGRAPH PICKUP CARTRIDGE STYLUS ROD

[75] Inventor: Tsunehiro Tsukagoshi, Tokyo, Japan

[73] Assignee: Pioneer Electronic Corporation, Tokyo, Japan

[22] Filed: May 14, 1974

[21] Appl. No.: 469,724

[30] Foreign Application Priority Data

May 14, 1973 Japan .......................... 48-56502[U]

[52] U.S. Cl. ...................................... 274/37; 29/197

[51] Int. Cl.[2] ............................................ G11B 3/02

[58] Field of Search .................... 274/37, 38; 29/197

[56] References Cited

UNITED STATES PATENTS

| | | | |
|---|---|---|---|
| 1,162,149 | 11/1915 | Eckhardt | 274/38 |
| 1,333,965 | 3/1920 | Fahrenwald | 75/1 |
| 1,792,494 | 2/1931 | Harrison et al. | 274/38 |
| 2,507,188 | 5/1950 | Weathers | 274/37 |
| 3,236,956 | 2/1966 | Kantrowitz | 274/37 |
| 3,576,955 | 5/1971 | Obata | 179/100.41 M |

*Primary Examiner*—Richard E. Aegerter
*Assistant Examiner*—John W. Shepperd
*Attorney, Agent, or Firm*—Sughrue, Rothwell, Mion, Zinn & Macpeak

[57] ABSTRACT

A phonograph pickup cartridge for sound reproduction from disc-type phonograph records has a stylus rod which mounts a stylus tip at the forward end and a moving element constructing one portion of a signal generating structure at the rear end, the stylus shoe being constructed of aluminum pipe with a vacuum vapor deposited beryllium layer formed on the periphery of the aluminum pipe, thereby reducing the dynamic mass for the stylus rod system of the cartridge while obtaining a stylus rod of high mechanical integrity.

1 Claim, 2 Drawing Figures

PHONOGRAPH PICKUP CARTRIDGE STYLUS ROD

BACKGROUND OF THE INVENTION

1. Field of the Invention

This invention relates to a phonograph pickup cartridge mounted and used at the forward end of a pickup arm for sound reproduction of disc-type phonograph records, and more particularly, to an improved stylus rod for the phonograph pickup cartridge.

2. Description of the Prior Art

A phonograph pickup cartridge having extremely high performance characteristics is required due to the recent progress within the audio technical field, and for achieving this end, attempts have been made to reduce the equivalent dynamic mass of the vibrating element assembly of the pickup cartridge. The stylus rod or stylus carriage is one of the principal elements which determine the dynamic mass of the vibrating element assembly and thus it is the requirement to reduce the dynamic mass of this element of the assembly as much as possible. As the diameter and thus the thickness of the metal pipe forming the stylus rod decreases, there is the undesirable side effect of the drop in mechanical intensity, integrity and hardness of the stylus rod. Therefore, the reduction of the dynamic mass of the stylus rod involves the restriction insofar as the material used is concerned, particularly where such material for the stylus shoe comprises aluminum or titanium.

A primary object therefore of the present invention is to provide a phonograph pickup cartridge stylus rod which is constructed of a novel material which satisfies all the requirements mentioned above.

SUMMARY OF THE INVENTION

The stylus rod of the present invention comprises an aluminum pipe having a beryllium layer about the periphery of the aluminum pipe. Preferably, the beryllium layer is formed by vacuum vapor deposition to provide porosity to the layer which permits of the high strength due to the presence of the beryllium but with low weight due to the porosity of that layer.

DESCRIPTION OF THE PREFERRED EMBODIMENT

Figure 1:
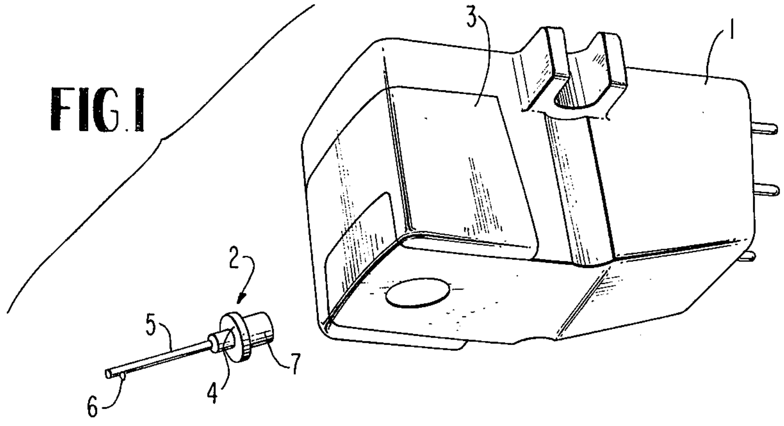
FIG. 1 is an exploded, perspective view of a phonograph pickup cartridge and stylus rod constructed in accordance with the present invention.

One preferred embodiment of the present invention will be explained in detail in accordance with the accompanying drawings. A phonograph pickup cartridge such as that shown in FIG. 1, for example, which may be of the moving magnet type, is constructed of a main body 1 including a generating coil assembly and a pole piece assembly, and a replaceable stylus rod assembly indicated generally at 2. The main body 1 is provided with a stylus rod assembly holder 3 while the stylus rod assembly 2 is provided with a stylus rod 5 elastically suspended by an elastomer member 4 which is appropriately secured within the holder 3. A stylus tip 6 and a magnet 7 are mounted at the forward and the rear end of the stylus rod, respectively, to each side of the elastomer member 4. When the elastomer member 4 is secured within holder 3 at a predetermined position with respect to the main body 1, the magnet 7 at the rear end of the stylus rod 5 is located between pole pieces (not shown) within the main body 1. Thereby, a signal generating structure, which generates an electric signal in accordance with the vibration of the stylus rod 5, through the stylus tip 6, is produced by the assembled elements of FIG. 1.

Figure 2:
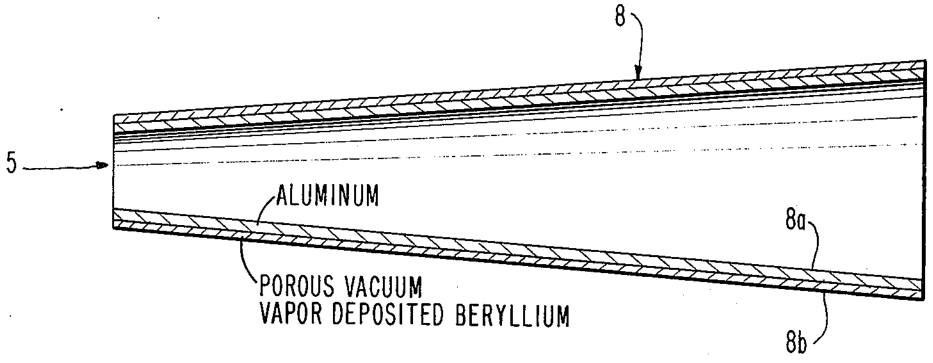
FIG. 2 is a longitudinal section through a part of the stylus rod of FIG. 1.

The present invention is directed to the specific construction of stylus rod 5. Stylus rod 5 is constructed in the form of a tapered pipe 8 as shown in FIG. 2, the pipe being composed essentially of a tapered aluminum pipe 8*a* which tapers towards the forward or tip end thereof and a beryllium layer 8*b* which is formed of predetermined thickness on the outer peripheral surface of the aluminum pipe 8*a*. The beryllium layer 8*b* is formed by vapor deposition of beryllium while turning the aluminum pipe 8*a* slowly which has been heated at or above 150° C., the aluminum pipe 8*a* being rotated about its axis within a vacuum vessel.

The beryllium layer has several superior physical properties such as that shown in the following chart compared with aluminum or titanium which is generally used in the prior art structures.

CHART

| | Density ($g/cm^2$) | Young's Modulus ($kb/mm^2$) | Ductility (%) | Tensile Strength ($Kg/mm^2$) |
|---|---|---|---|---|
| Beryllium | 1.84 | 28000 | 2 - 20 | 28 - 67 |
| Aluminum | 2.69 | 7400 | 30 | 10 - 50 |
| Titanium | 4.54 | 11000 | 20 - 60 | 35 - 56 |

It can be seen from the above, that the stylus rod 5 in the form of a tapered pipe and in which a beryllium layer 8*b* is laminated to the peripheral surface of the aluminum pipe 8*a* has the mechanical strength, integrity and hardness permitting it to be superior to conventional pipe of similar form, constructed of aluminum or titanium alone. Thus, a pipe 8 may be used for this stylus rod 5 having the same mechanical integrity and hardness as conventional pipe, while achieving reduction in the diameter and metal thickness thereof to reduce overall the dynamic mass of the stylus rod 5 of the present invention. Further, since the beryllium layer 8*b* is formed under the conditions mentioned above and is porous, it is possible to substantially reinforce the aluminum pipe 8*a* without a remarkable weight addition due to the porosity of the vacuum vapor deposited layer of beryllium.

Aluminum is particularly useful as the material of pipe 8*a* since the aluminum is both light in weight and easy to manufacture, and further, the aluminum has a very strong chemical attraction or affinity for the beryllium layer 8*b*.

Although there has been described a preferred embodiment of the novel invention, many variations and modifications will now be apparent to those skilled in the art. Therefore, this invention is to be limited, not by the specific disclosure herein, but only by the appending claims.

What is claimed is:

1. In a phonograph pickup cartridge stylus rod of the type wherein said rod mounts a stylus tip at the forward end and has a moving element constituting one portion of a signal generating structure at the rear end, the improvement wherein: said stylus rod comprises an aluminum pipe whose periphery carries a porous vacuum vapor deposited beryllium layer.

* * * * *